April 11, 1950     E. C. TAYLOR ET AL     2,503,307
VELOCITY MEASURING APPARATUS ADAPTED FOR USE
IN IMPACT TESTING MACHINES
Filed Sept. 21, 1945     2 Sheets-Sheet 1
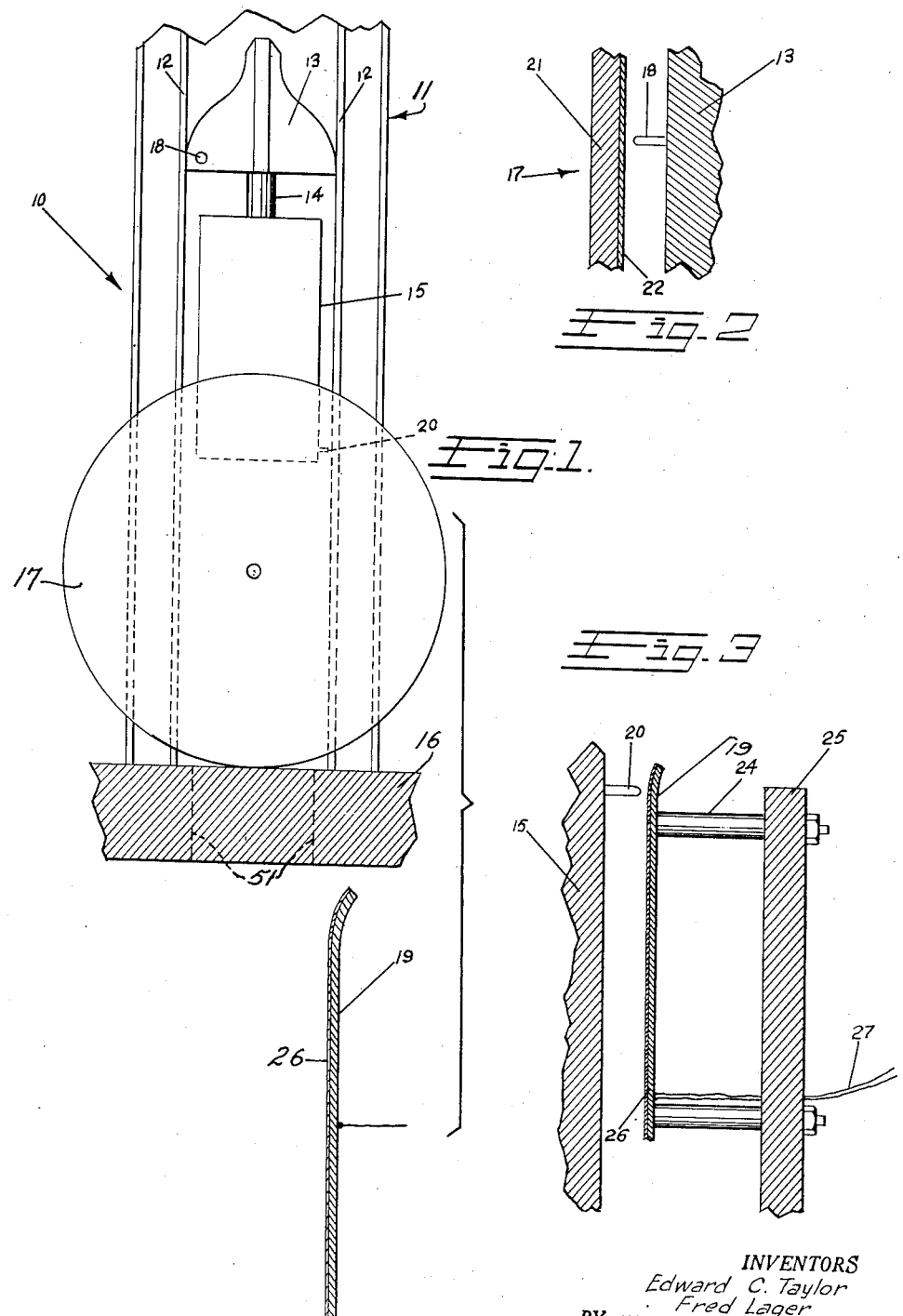
INVENTORS
Edward C. Taylor
Fred Lager
BY William H. Hoppmann II
Ralph L Chappell
ATTORNEY

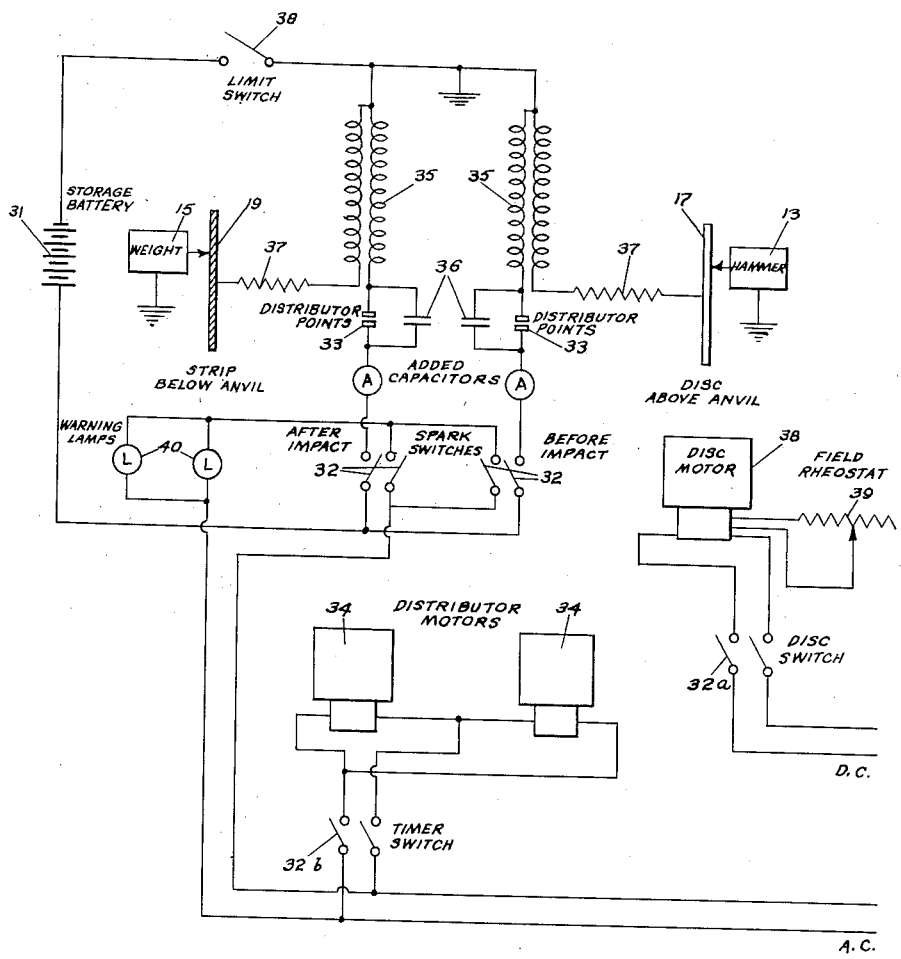

Patented Apr. 11, 1950

2,503,307

UNITED STATES PATENT OFFICE 2,503,307

VELOCITY MEASURING APPARATUS ADAPTED FOR USE IN IMPACT TESTING MACHINES

Edward C. Taylor and William H. Hoppmann, II, Valley Stream, and Fred Lager, New York, N. Y.

Application September 21, 1945, Serial No. 617,901

4 Claims. (Cl. 73—12)

(Granted under the act of March 3, 1883, as amended April 30, 1928; 370 O. G. 757)

This invention relates in general to a spark recorder and in particular to a spark recorder adapted to locate and record the position of a moving object at a series of predetermined instants.

In copending application, Serial No. 617,900, entitled "Impact tester" and filed September 21, 1945, by William H. Hoppmann, II, there is disclosed a method and apparatus for testing the high-speed tensile characteristics of construction materials. In this apparatus a specimen is suspended between a guided weight and a guided hammer and the assembly is directed against an anvil adapted to arrest the motion of a hammer without stopping the motion of the weight, thereby causing the specimen to be pulled and broken between the hammer and weight. In this and numerous other cases it is necessary to record the position and velocity of a moving body in order to ascertain its velocity, and in this case the change in velocity of a given time interval.

Accordingly, it is an object of this invention to provide apparatus for locating and recording the position of a moving object at a plurality of spaced times.

It is a further object to provide a spark recorder adapted to record the position of a moving object at a series of times at predetermined intervals.

It is another object to provide a method and apparatus for recording the position and velocity of a moving assembly prior to its impact against an anvil and to record the position and velocity of parts of this assembly after the impact.

Further objects and advantages of this invention, as well as its construction, arrangement and operation, will be apparent from the following description and claims in connection with the accompanying drawings, in which:

Figure 1 is a schematic side elevation showing the arrangement of a spark recorder, according to this invention, on an impact tester as described in hereinbefore referred to application, Serial No. 617,900, filed September 21, 1945.

Figure 2 is a cross section of a portion of the apparatus showing a recording strip positioned to receive a spark from a spark point mounted on the moving hammer shown in Figure 1.

Figure 3 is a cross section of a portion of the apparatus showing a recording strip adapted to receive a spark from the falling weight, and Figure 4 is a wiring diagram of the spark recorder electrical circuit.

There is shown in Figure 1 an impact testing apparatus, generally designated 10 comprising a tower 11 having a pair of guide rails 12 on which a hammer or tup 13 is adapted to slide. Suspended below the hammer by means of a specimen 14 is a weight 15. This falling assembly is directed against an anvil 16 at the base of tower 11, and anvil being adapted to arrest the motion of hammer 13 and optionally to cause it to rebound upwards and at the same time to permit the weight to pass therethrough. The anvil 16 is provided with the aperture or passage 51, which is large enough to permit the weight 15 to pass through it, but which is smaller than the area encompassed by the hammer 13.

Mounted adjacent to the anvil at the bottom of tower 11 is a rotating disk 17, the surface of which is parallel with direction of motion of the tup assembly. A point or prong 18 (refer also to Figure 2) projects from the hammer in the direction of the disk and is adapted to pass within a sparking distance of the surface of the disk as will be hereinafter described.

Mounted below the anvil is a metallic strip 19 with its surface parallel to the motion of the falling assembly and so positioned that the falling weight after impact passes near to its surface. A projection 20 (also see Figure 3) is mounted on the falling weight and adapted to pass within a sparking distance of the surface of this strip.

Suitable electric leads are connected to the rotating disk and to the metallic strip according to conventional means and suitable electric grounds are provided on the hammer and weight.

Figure 2 is a cross section indicating the relative positions of the hammer 13 and disk 17 at a time slightly before the impact period and showing a general construction of the disk. A disk 17 comprises a relatively smooth metal surface preferably formed by a metal disk 21 conventionally rotatably mounted adjacent to the base of the tower 11. On the inner surface of this disk facing the falling assembly is a layer of waxed paper 22 or the like which is adapted to leave a visible record of an electric sparking between a disk 21 and the spark point 18.

This disk is preferably rotatably mounted by conventional means on a turning device, which is adapted to rotate the disk at a relatively slow speed. A suitable turning motor and mounting means are conventional and therefore are not shown in the figures. Preferably this disk is rotated at such a speed that the disk passes through about a 10 or 20 degree arc while the hammer is passing down in front of the disk and rebounding upward. By this means the path of point 18 on the waxed paper will be represented by a series of dots lying substantially in two straight lines in V formation. These lines are actually slightly curved, and an exact measurement of the distance travelled by the point 18 may be determined geometrically; however, for all practical purposes a sufficiently accurate result may be obtained by measuring the straight line distance between two points. The slight rotation of the disk serves the purpose of separating these lines and enabling the determination of which points were traced by the falling hammer and which points were traced by the rebounding hammer.

In Figure 3 there is shown a cross section of the strip spark plate for determining the velocity of the falling weight after the impact period. Inasmuch as the weight passes this point only once for each impact, it is unnecessary to provide a rotating disk in this position.

Accordingly, there is provided a relatively narrow strip 19 mounted by extension arms 24 on an insulating support 25. On the surface of the strip 19 is a strip of waxed paper 26 or the like adapted to leave record of electric sparks as in the case of the waxed paper 22 on the recording disk 21 described in Figure 2. An electric wire 27 leads to the electric circuit, which will be hereinafter described, and a spark point 20 mounted on weight 15 approaches the spark strip 19.

The spark gaps between the disk 17 or strip 19 and the spark point 18 or 20, respectively, are large enough to prevent physical contact between the two members, yet small enough to permit a spark to be readily carried therebetween. This adjustment is conventional and well within the ability of the skilled workman.

The sparking disk 21 and the sparking strip 19 are activated by the electric circuit as will be described hereinafter through switches (shown in Figure 4) which may be either manually controlled or automatically controlled by the falling weight. For example, the weight or hammer passing a point above the sparking apparatus may be used to throw a switch energizing the apparatus without interfering with the accuracy of the test, and such switch setup is conventional.

Figure 4 is a wiring diagram for the herein described spark recording apparatus. The sparking electric potential is provided by means of a conventional storage battery 31 preferably having an E. M. F. of about 18 volts, the battery being connected through switches 32, which control the energization of the sparking disk and sparking strips 17 and 19. The high-potential spark is supplied by a pair of six-contact automobile distributors 33, which are driven respectively by a pair of electric motors 34, and the electric interruption is transformed to a high potential spark by means of coils 35 and condensers 36 according to conventional electric practice. The mechanical hookup between these distributors and electric motors is conventional and accordingly is not set forth in separate figures. In series with the disk 17 and strip 19 are 0.03 megohm resistances 37, which serve to prevent a plurality of sparks that otherwise might be caused by a resurging current. Switch 38 is attached to the impact tester to shut off the current automatically at the end of a test. Suitable electric currents are provided as indicated in the wiring diagram.

The disk 17 is rotated by a disk motor 38, which is powered by a suitable source of, for example, 220 volts D. C., and which is controlled by conventional means such as rheostat 39. The operation of this motor is controlled by switches 32a, which may be either manually or automatically controlled.

The distributors are operated by means of distributor motors 34 powered, for example, by 110 volts A. C. current and controlled by switches 32b, which may be manually or automatically controlled. These distributor motors are optionally adapted to operate the distributors at 30 revolutions per second, which results in a sparking frequency of 180 per second.

A pair of warning lamps 40 are optionally connected into the electric circuit at a convenient point to indicate when the circuit is in operation.

In the use and operation of this sparking recorder the following procedure is carried out. The hammer and weight assembly is raised to the top of tower 11. The switches operating the sparking recorder (if manually controlled) are closed and the assembly permitted to fall. After the impact the hammer may or may not rebound depending on the nature of the specimen, and the weight continues to fall. A spark between the hammer and the disk 17 traces a series of dots (V-shaped, if the hammer rebounds), which indicate the speed of the falling and rebounding hammer. If possible, these dots are counted off into groups of six to eliminate the chance of error caused by uneven location of the distributor points within the distributor. Likewise on strip 19 below the anvil there is recorded a series of dots indicating the speed of the weight after the impact. These dots likewise are counted off into groups of six in order to reduce error. From the records obtained on the strip and disk of waxed paper there may be obtained data that enable calculation of the velocities of the hammer and weight before and after impact thereby enabling a calculation of the amount of energy absorbed by the specimen in breaking.

Simultaneously with the taking of these measurements there may be made other electrical measurements as indicated in copending application, Serial No. 617,902, entitled "Electrical measuring apparatus," and filed September 21, 1945 by William H. Hoppmann, II, and Edward C. Taylor, now Patent No. 2,475,614, July 12, 1949.

It is to be understood that while this spark recorder has been particularly described in connection with an impact testing apparatus, nevertheless the scope of the spark recorder is not limited thereto. Numerous variations and modifications in the spark recorder may be made to meet certain specific problems which arise in connection with its use either on an impact tester or on other types of apparatus, and these variations and modifications are within the ability of one skilled in the art, and accordingly it is to be understood that the scope of this invention is not to be delineated by the specifications and drawings but on the contrary is indicated by the appended claims.

The invention described herein may be manufactured and used by or for the Government of the United States of America for governmental purposes without the payment of any royalties thereon or therefor.

What is claimed is:

1. A spark recorder for recording the velocities of a rebounding object and of an object moving in only one direction, said recorder comprising a rotatable metallic disk positioned adjacent to and parallel with the path of the rebounding object and a metallic strip positioned adjacent to and parallel with the path of the object moving in only one direction, a spark generator electrically connected to said disk and said strip, a sparking point positioned on each of said objects and adapted to pass within a sparking distance of the disk and strip respectively, electric grounds on said objects, and a record receiving means on the surfaces of the disk and strip to record the positions of sparks thereon.

2. In an impact testing machine having a guided rebounding hammer and a guided weight, a spark recorder comprising a rotatable metallic disk adjacent to and parallel with the path of the hammer and a metallic strip adjacent to and parallel with the path of the weight, a spark generator electrically connected to said strip and said disk, a sparking point on said hammer positioned to pass within a sparking distance of said disk and a sparking point on said weight positioned to pass within a sparking distance of said strip, and waxed paper on the surfaces of the disk and strip to record the position of sparks passing between said disk and said hammer and between said strip and said weight.

3. In an impact testing machine having a guided rebounding hammer and a guided weight, a spark recorder comprising a rotatable electrically conducting disk adjacent to and parallel with the path of the hammer and an electrically conducting strip adjacent to and parallel with the path of the weight, a spark generator which generates sparks at regular predetermined intervals electrically connected to said strip and said disk, a sparking point on said hammer positioned to pass within a sparking distance of said disk and a sparking point on said weight positioned to pass within a sparking distance of said strip, and record receiving means on the surfaces of the disk and strip to record the position of sparks passing between said disk and said hammer and between said strip and said weight.

4. In an impact testing machine having a guided rebounding hammer, a spark recorder comprising a rotatable metallic disk adjacent to and parallel with the path of the hammer and opposite the position of reversal of direction, a spark generator electrically connected to said disk and adapted to generate sparks at regular predetermined intervals, a sparking point on said hammer positioned to pass within a sparking distance of the disk, and waxed paper on the surface of the disk to record the positions of sparks between the disk and the sparking point.

EDWARD C. TAYLOR.
WILLIAM H. HOPPMANN, II.
FRED LAGER.

REFERENCES CITED

The following references are of record in the file of this patent:

UNITED STATES PATENTS

| Number | Name | Date |
|---|---|---|
| 1,240,416 | Buckwalter | Sept. 18, 1917 |
| 1,655,615 | Kreisel | Jan. 10, 1928 |
| 1,768,512 | Leeuw | June 24, 1930 |
| 1,807,615 | Behr | June 2, 1931 |
| 1,985,478 | Yuasa | Dec. 25, 1934 |
| 2,024,230 | Klopsteg | Dec. 17, 1935 |
| 2,067,140 | Dinzl | Jan. 5, 1937 |
| 2,296,676 | Kearsley | Sept. 22, 1942 |
| 2,319,342 | Perrey | May 18, 1943 |
| 2,362,589 | Simmons, Jr. | Nov. 14, 1944 |